(12) United States Patent
Merget et al.

(10) Patent No.: US 6,598,184 B1
(45) Date of Patent: Jul. 22, 2003

(54) METHOD AND APPARATUS FOR DETERMINING THE FAILURE PROBABILITY OF A DATA NETWORK

(75) Inventors: Peter Merget, Esslingen (DE); Dieter Seidl, Reutlingen (DE); Eberhard Zeeb, Ulm-Juningen (DE)

(73) Assignee: DaimlerChrysler AG, Stuttgart (DE)

( * ) Notice: Subject to any disclaimer, the term of this patent is extended or adjusted under 35 U.S.C. 154(b) by 414 days.

(21) Appl. No.: 09/606,059

(22) Filed: Jun. 29, 2000

(30) Foreign Application Priority Data

Jun. 29, 1999 (DE) .......................... 199 29 943

(51) Int. Cl.[7] .......................... H02H 3/05; G06F 11/30; G06F 15/173; G01R 31/08
(52) U.S. Cl. .......................... 714/47; 714/4; 702/186; 709/223; 709/224; 709/238; 370/237; 370/238
(58) Field of Search .............. 714/4, 47; 702/182–186, 702/57, 69; 709/223–224, 238–242; 370/237–238, 242, 245

(56) References Cited

U.S. PATENT DOCUMENTS 4,967,345 A * 10/1990 Clarke et al. ............... 709/241
5,699,403 A * 12/1997 Ronnen ........................ 135/90
6,321,187 B1 * 11/2001 Squier et al. ................. 703/18
6,483,803 B1 * 11/2002 Elahmadi et al. ........... 370/216

FOREIGN PATENT DOCUMENTS

DE 195 38 753 A1 10/1995

OTHER PUBLICATIONS

Jian Pu, Eric Manning, Gholamali Shoja, "Routing Reliability Analysis of Partially Disjointed Paths", Aug. 2001.*
Shengli Yuan, Jason Jue, "A Heuristic Routing Algorithm for Shared Protection in Connection–Oriented Network", Aug. 2001.*

* cited by examiner

Primary Examiner—Robert Beausoliel
Assistant Examiner—Emerson Puente
(74) Attorney, Agent, or Firm—Crowell & Moring LLP

(57) ABSTRACT

In a method for determining the failure probability of a data network which has at least one transmitter, a transmission medium, components which attenuate and/or amplify the power, and at least one receiver, the data network is subdivided into individual point-to-point connecting paths, and a failure probability is determined separately for each point-to-point connecting path. The total failure probability of the data network is determined as the sum of the individual probabilities of the individual point-to-point connecting paths, minus the probability that two or more point-to-point connecting paths will fail simultaneously.

8 Claims, 3 Drawing Sheets

METHOD AND APPARATUS FOR DETERMINING THE FAILURE PROBABILITY OF A DATA NETWORK

BACKGROUND AND SUMMARY OF THE INVENTION

This application claims the priority of German application DE 199 29 943.9, filed in Germany on Jun. 29, 1999, the disclosure of which is expressly incorporated by reference herein.

The invention relates to a method and apparatus for determining the failure probability of a data network.

A signal level control method for optical conductor transmission paths is described in German Patent Document DE 19538753 A1. At least two optical conductor transmission paths in an optical data network are joined together via an optical coupler to form a multichannel system. The levels of optical signals vary as between the transmission paths, and differ in the different network sections, dependent on various factors. In particular, the optical components present in the different path sections attenuate the light level. Optical couplers are used to join the optical conductor transmission paths together. In order to match the different levels for this purpose, at least one automatically acting optical level controller is provided in each of the optical conductor transmission paths, and automatically adapts the level. A controllable optical attenuating element is proposed, for example, as the level controller.

A disadvantage of this type of data network is that, although the signal levels are equalized in order to join them together, level limit violations can nevertheless occur at the receiver, and can lead to failure of the data network. For example, the sensitivity of the receiver may be undershot or the receiver may be overdriven due to a receiver-dependent light level being undershot or overshot. Moreover, the optimum dimensioning of the data network is not disclosed.

One object of the invention is to facilitate the design and dimensioning of optical data networks.

Another object of the invention is to improve the robustness of optical data networks.

These and other objects and advantages are achieved by the method and apparatus according to the invention in which the failure probability of a data network which has at least one transmitter, a transmission medium, components which attenuate and/or amplify the power, and at least one receiver, is determined by subdividing the data network into individual point-to-point connecting paths, and determining a failure probability separately for each connecting point. The total failure probability of the data network is then determined as the sum of the individual probabilities of the individual point-to-point connecting paths, minus the probability that two or more point-to-point connecting paths will fail simultaneously.

A major advantage of these refinements is that a failure probability can be determined for the data network even when such data networks are being designed and dimensioned. This allows optimum design of the data network, in particular with regard to the insertion of attenuating and/or amplifying components. The data network can be optimized even at the planning stage so that, when it is brought into use, the probability of data network failures is minimized.

Other advantages, features, and details of the invention will be found in the description below in which a number of embodiments of the invention are described in detail with reference to the drawings. The features referred to in the claims and the specification may be important to the invention individually or in any combination.

DETAILED DESCRIPTION OF THE DRAWINGS

Figure 1:
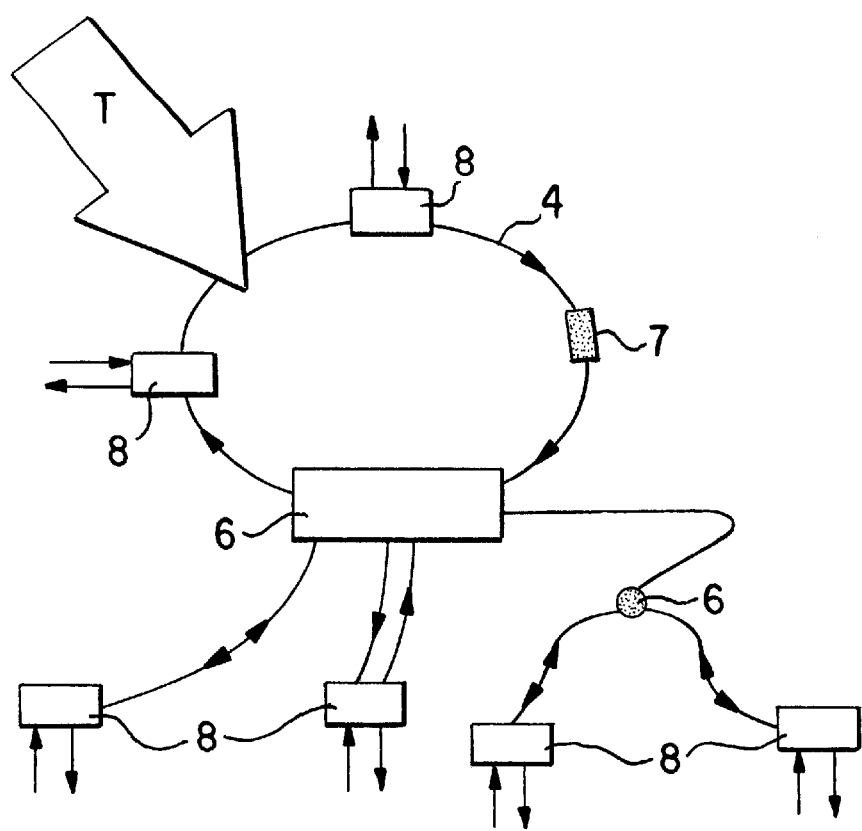
FIG. 1 is a schematic illustration of an optical data network.

FIG. 1 is a schematic illustration of an optical data network, in which there are interfaces 8 to an electrical part of the network. (Electrical lines are represented by dashed lines, and the optical lines by solid lines). An optical data network has been chosen here as an exemplary embodiment. However, the data network may also be an electrical data network, or data transmission may be carried out by radio or ultrasound.

In addition to the optical conductors as transmission medium 4, the optical data network also has, for example, couplers 6 and 7 as attenuating elements. Apart from the electrical input parameters for the transducer modules, additional parameters which may influence the transmission response of such an optical system include in particular environmental influences T such as temperature, humidity, dirt, mechanical loads, or the influence of chemicals. Furthermore, the optical characteristics of some components and modules may vary with time, so that the age of the system is also relevant. These influences are taken into account in the further analysis of the attenuation and amplification characteristics of the components.

Figure 2:
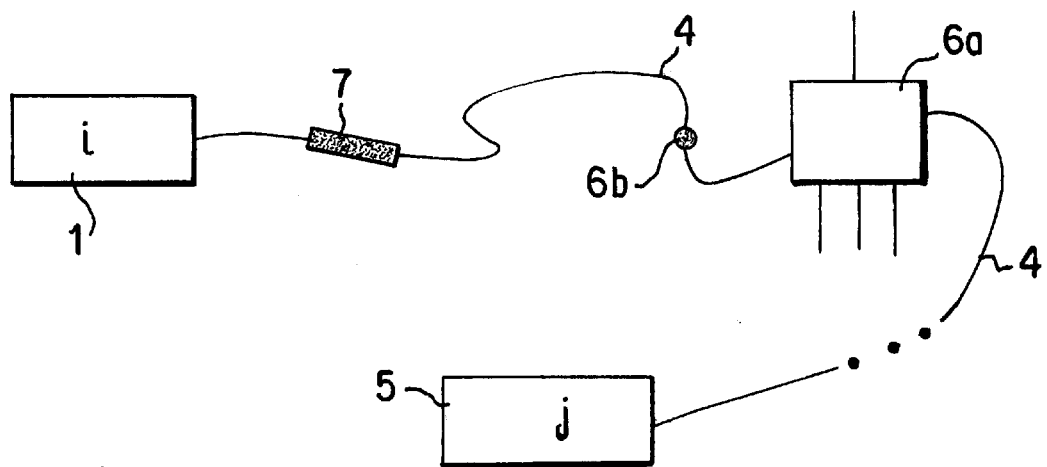
FIG. 2 is a schematic illustration of point-to-point connecting paths in an optical data network.

FIG. 2 now shows a schematic illustration of point-to-point connecting paths in an optical data network. In order to determine a total failure probability $W_{tot}$, the optical data network is subdivided into individual subareas, so-called point-to-point connecting paths, and the failure probability $W_i$ is determined for each individual connecting path. Apart from optical conductors 4, various attenuating elements are arranged between the optical transmitter 1 of the network subscriber i and the optical receiver 5 of the network subscriber j. The attenuating elements are a coupler 7, a star coupler 6a and a coupler 6b, for line branching. The network subscribers of a data network in a vehicle are a radio, a CD player, a voice recognition device and other items. The optical power $P_a$ arriving at the receiver 5 can be determined from the transmission power Pe and the individual attenuation terms Di in the connecting path.

$$Pa = Pe - SDi$$

If the incoming power is less than the limiting sensitivity GE of the receiver 5, error-free conversion to an electrical signal does not take place, so that the transmission via this point-to-point connecting path is faulty. The same result also occurs if the light power arriving at the receiver 5 is greater than its overdriving limit VE.

Figure 3:
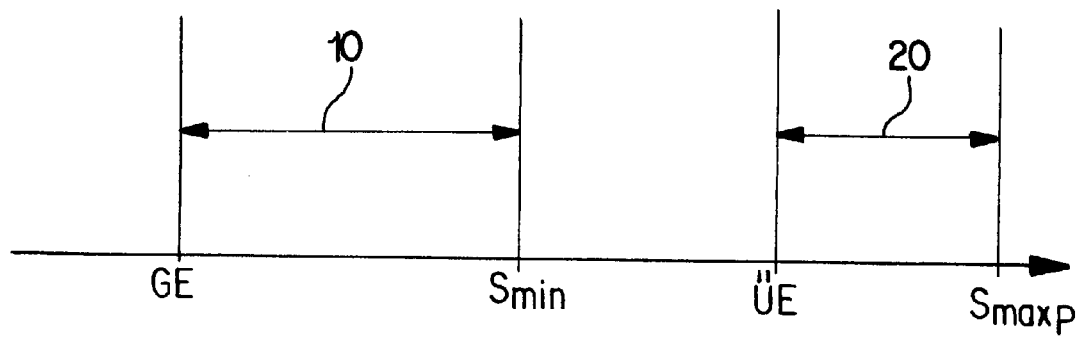
FIG. 3 is a graph which shows the light level limits in the receiver.

FIG. 3 shows a graph of the light level power limits for the receiver 5. A signal level limitation analysis must take into account both the upper limits for the transmitter output $P_e$ specified in all possible environmental conditions, and the limiting sensitivities GE of the receiver 5. These values are used to determine the amount of additional attenuation (by optical components in the transmission path between the transmitter 1 and the receiver 5) which can be tolerated or which is required, and to define the layout of the optical data network.

Not only do optical components attenuate the light power, but amplifiers, in particular, amplify it. The light power arriving at the receiver 5, however, must be kept between the sensitivity limit GE and the overdriving limit UE (see FIG. 3). If the light power arriving at the receiver 5 is not within these limits, then this is referred to as a failure of the data network. The attenuation or the amplification of the light power by the optical components must be taken into account for this purpose, as illustrated in FIG. 3.

If the component manufacturer guarantees the specified limit values, it may be possible to preclude the failure of the connecting path. That is, the optical signal is converted at the receiver 5 into an electrical signal without error if the incoming light power is between the limiting sensitivity GE and the overdriving limit ÜE of the receiver 5. To assure that this is so, the transmission power of the transmitter 1 must not be less than Smin to ensure that sufficient light power arrives at the receiver 5 if the optical components located in the connecting path additionally cause an attenuation 10 of the light power P. On the other hand, the output power of the transmitter 1 must not exceed Smax in order that the light power arriving at the receiver 5 does not exceed the overdriving limit ÜE, taking into account the additional attenuation 20 by the optical components.

Figure 4:
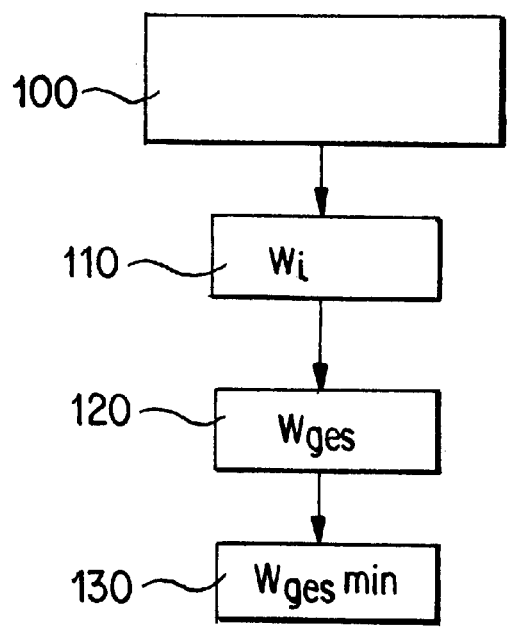
FIG. 4 is a diagram of the method sequence according to the invention.

FIG. 4 shows a diagram of the method sequence according to the invention for determining the total failure probability $W_{tot}$ of an optical data network. In 100, the optical data network 1 is subdivided into point-to-point connecting paths, to be considered separately from one another. In each point-to-point connecting path, the probability density of the light attenuation and/or amplification of the optical components located in that path is determined in 110. Manufacturers' details may be used for this purpose; and the light power of the transmitter 1 and the sensitivity of the receiver 5 are also taken into account. If the light power arriving at the receiver 5 is beyond the limits of the light power which can be processed further, then this is considered to be a failure of the point-to-point connecting path. Such failure probability $W_i$ is then determined for each point-to-point connecting path.

The total failure probability $W_{tot}$ of the data network is determined in 120. Since the individual point-to-point connections in a data network are independent of one another, in terms of the failure probabilities $W_i$, the total failure probability $W_{tot}$ of the system is the sum of the failure probability $W_i$ of all the point-to-point connecting paths, minus the probability that two or more connecting paths will fail simultaneously.

Figure 5:
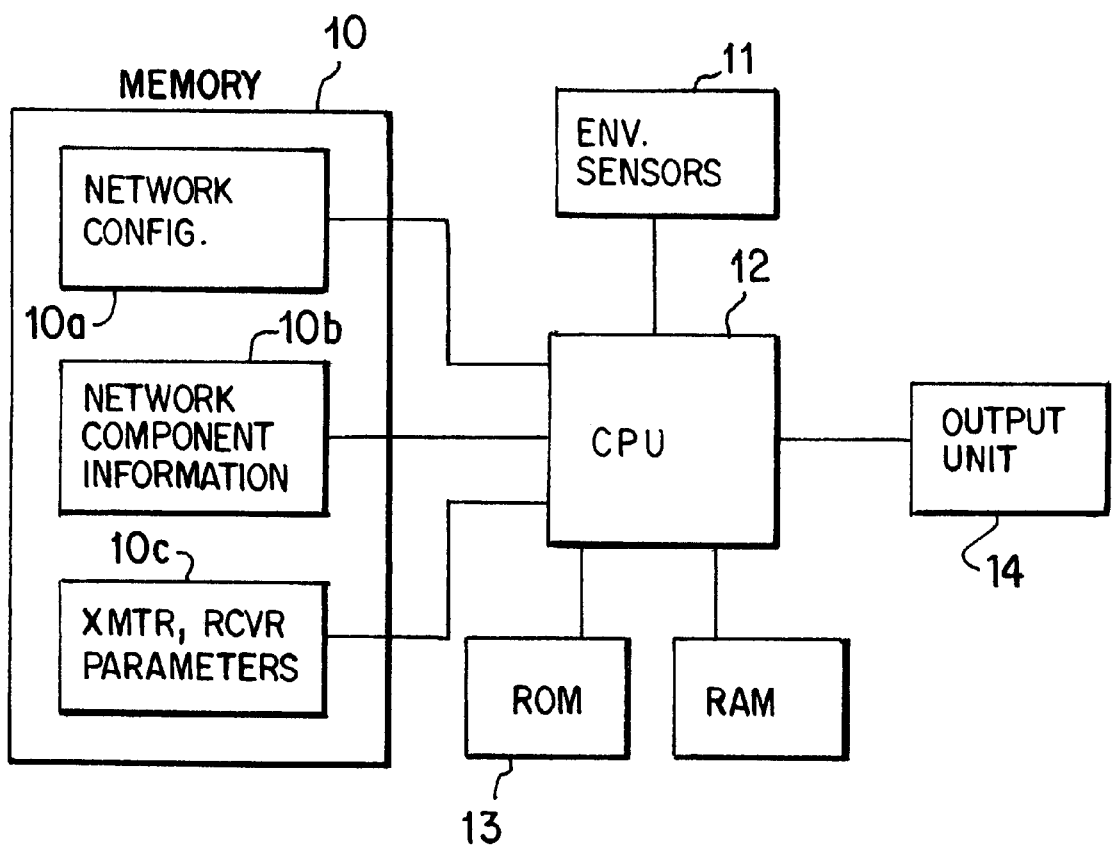
FIG. 5 is a conceptual block diagram of an apparatus for determining failure probability according to the invention.

FIG. 5 shows an embodiment of an apparatus for determining the probability of a network failure according to the invention. As shown there, a memory 10 has stored therein network configuration information 10a concerning the layout and connections of the data network, including the transmission medium and the location and nature of circuit components therein. Also stored in the memory 10 is network component information 10b concerning the attenuation or amplification characteristics of the respective circuit elements, and transmitter and receiver parameters 10c regarding the power capacity of both. In addition sensors 11 may be provided for detecting environmental conditions which affect the transmission response of the data network, as described previously.

Information from blocks 10a–10c in the memory 10 is read into the computer 12, which determines the failure probability of the data network based on this information, using a program stored in ROM 13 for implementing the analytical steps described previously. The overall system failure probability is then displayed or otherwise communicated via the output unit 14.

For optimization of a data network, the total failure probability $W_{tot}$ is minimized. This method is particularly suitable for dimensioning an optical data network while in use in the field, for example in mobile systems such as motor vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining failure probability of a data network which has at least one transmitter, transmission medium, components coupled in said transmission medium, each of which components attenuates or amplifies power of a signal transmitted via said data network, and at least one receiver, said method comprising:

subdividing the data network into individual point-to-point connecting paths;

determining a failure probability $W_i$ separately for each connecting path; and determining the total failure probability $W_{tot}$ of the data network by summing the individual probabilities $W_i$ of the individual connecting paths, and subtracting the probability that two or more point-to-point connecting paths will fail simultaneously.

2. The method for determining failure probability of a data network according to claim 1, wherein the data network is optimized such that the total failure probability $W_{tot}$ is minimized.

3. The method for determining failure probability of a data network according to claim 1, wherein probability density of power which arrives at the receiver is determined, in which case a sensitivity limit of the receiver being overshot or undershot leads to a failure of the data network.

4. The method for determining failure probability of a data network according to claim 3, wherein the probability density of power which occurs at the receiver is determined by determining probability density of the power of the transmitter and the probability density of the attenuation or amplification of each component inserted in a point-to-point connecting path.

5. The method for determining failure probability of a data network according to claim 4, wherein probability density of the attenuation or amplification of the component is dependent on environmental influences, such as the temperature, voltage supply, dirt and age.

6. The method for determining failure probability of a data network according to claims 1, wherein the data network is one of an electrical network, an optical data network, a radio network and an ultrasound network.

7. Apparatus for determining failure probability of a data transmission network having a transmitter, a transmission medium coupling the transmitter to a receiver and a plurality signal network attenuating components distributed in the medium, said apparatus comprising:

a computer;

a first memory element for storing network configuration information which characterizes connection and routing of said network between said transmitter and said receiver;

a second memory element for storing network component information characterizing attenuation or amplification characteristics of said network components;

a third memory element for storing power capacity parameters for said transmitter and said receiver; and a fourth memory element encoded with a program for causing said computer to perform the steps of subdividing the data network into a plurality of individual point-to-point connecting paths, based on said network configuration information;

determining a failure probability for each connecting path based on said network configuration information, said network component information and said power capacity parameters; and determining the total failure probability $W_{tot}$ of the data network by summing the individual probabilities $W_i$ of the individual connecting paths, and subtracting the probability that two or more point-to-point connecting paths will fail simultaneously.

8. The apparatus according to claim 7 further comprising a source of information concerning environmental parameters which affect transmission/attenuation properties of said data network, wherein said computer program causes said computer to determine the failure probability of each connecting path based also on said environmental parameters.

* * * * *